(12) United States Patent
Deng et al.

(10) Patent No.: US 10,728,722 B2
(45) Date of Patent: Jul. 28, 2020

(54) V2X MESSAGE TRANSMISSION METHOD AND RELATED NETWORK ELEMENT

(71) Applicant: Huawei Technologies Co., Ltd., Shenzhen (CN)

(72) Inventors: Qiang Deng, Shenzhen (CN); Wanqiang Zhang, Beijing (CN); Zhenglei Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/291,772

(22) Filed: Mar. 4, 2019

(65) Prior Publication Data
US 2019/0208383 A1    Jul. 4, 2019

Related U.S. Application Data

(63) Continuation of application No. PCT/CN2016/098047, filed on Sep. 5, 2016.

(51) Int. Cl.
*H04W 4/40* (2018.01)
*H04L 29/08* (2006.01)
*H04W 4/12* (2009.01)

(52) U.S. Cl.
CPC ............ *H04W 4/40* (2018.02); *H04L 29/08* (2013.01); *H04L 67/12* (2013.01); *H04W 4/12* (2013.01)

(58) Field of Classification Search
CPC .......... H04W 4/40; H04W 4/12; H04L 67/12; H04L 29/08
See application file for complete search history.

(56) References Cited

U.S. PATENT DOCUMENTS

| | | | |
|---|---|---|---|
| 2013/0007287 A1* | 1/2013 | Chu | H04L 12/189 709/227 |
| 2013/0288668 A1 | 10/2013 | Pragada et al. | |
| 2014/0086177 A1 | 3/2014 | Adjakple et al. | |
| 2015/0023668 A1 | 1/2015 | Spaulding et al. | |
| 2016/0080163 A1 | 3/2016 | Taylor | |
| 2016/0249266 A1* | 8/2016 | Kim | H04W 4/06 |
| 2017/0069207 A1 | 3/2017 | Ma | |

(Continued)

FOREIGN PATENT DOCUMENTS

| | | |
|---|---|---|
| CN | 105100167 A | 11/2015 |
| CN | 105163285 A | 12/2015 |

(Continued)

OTHER PUBLICATIONS

"3rd Generation Partnership Project; Technical Specification Group Services and System Aspects; Architecture Enhancements for V2X Services (Release 14)," 3GPP TS 23.285 V0.1.0, Jul. 2016, 14 pages.

(Continued)

*Primary Examiner* — Marisol Figueroa
(74) *Attorney, Agent, or Firm* — Slater Matsil, LLP (57) ABSTRACT

A V2X message transmission method and a related network element are provided. The method includes: receiving, by a base station, a V2X message sent by user equipment UE on a vehicle-to-everything V2X bearer, where the V2X bearer is a bearer used to transmit only the V2X message between the UE and the base station; and sending, by the base station, the V2X message to a local broadcast multicast service center BM-SC.

14 Claims, 9 Drawing Sheets

(56) References Cited

U.S. PATENT DOCUMENTS

2018/0124574 A1* 5/2018 Byun .................. H04W 4/06
2018/0146362 A1  5/2018 Hou et al.
2019/0059019 A1* 2/2019 Wallentin .......... H04W 28/0268

FOREIGN PATENT DOCUMENTS

CN        105338497 A    2/2016
CN        105792310 A    7/2016
WO      2011081590 A1   7/2011

OTHER PUBLICATIONS

"3rd Generation Partnership Project; Technical Specification Group Services and System Aspects; General Packet Radio Service (GPRS) Enhancements for Evolved Universal Terrestrial Radio Access Network (E-UTRAN) Access (Release 14)," 3GPP TS 23.401 V14.0.0, Jun. 2016, 374 pages.

"3rd Generation Partnership Project: Technical Specification Group Services and System Aspects; Group Communication System Enablers for LTE (GCSE_LTE); Stage 2 (Release 13)," 3GPP TS 23.468 V13.3.0, Dec. 2015, 30 pages.

"3rd Generation Partnership Project; Technical Specification Group Services and System Aspects; Multimedia Broadcast/Multicast Service (MBMS); Architecture and Functional Description (Release 13)," 3GPP TS 23.246 V13.3.0, Dec. 2015, 68 pages.

3GPP TS 23.401 V10.12.0, "General Packet Radio Service(GPRS) enhancements for Evolved Universal Terrestrial Radio Access Network(E-UTRAN) (Release 10)", 3rd Generation Partnership Project, Technical Specification Group Services and System Aspects, Jun. 2014. 270 pages.

* cited by examiner

V2X MESSAGE TRANSMISSION METHOD AND RELATED NETWORK ELEMENT

CROSS-REFERENCE TO RELATED APPLICATIONS

This application is a continuation of International Application No. PCT/CN2016/098047, filed on Sep. 5, 2016, the disclosure of which is hereby incorporated by reference in its entirety.

TECHNICAL FIELD

The present application relates to the field of communications technologies, and in particular, to a V2X message transmission method and a related network element.

BACKGROUND

Vehicle-to-everything (V2X) is a huge interaction network including information such as vehicle locations, speeds, and routes. Application scenarios of the vehicle-to-everything may include vehicle-to-vehicle (V2V) communication, vehicle-to-infrastructure (V2I) communication, and vehicle-to-pedestrian (V2P) communication. The V2X is a key technology of an intelligent traffic and transportation system. A series of traffic information such as real-time road conditions, road information, and passenger information can be obtained by using this technology, thereby improving driving security, reducing congestion, increasing traffic efficiency, providing in-vehicle entertainment information, and so on.

In an existing 3rd Generation Partnership Project (3GPP) system, data sent by user equipment (UE) is transmitted to an application server on an air interface bearer (between the UE and a base station) and a core network bearer (between the base station and a packet data gateway (PGW)). Therefore, data transmission delays include an air interface transmission delay and a core network transmission delay. V2X service data transmission has a relatively high requirement on real-time performance. However, in a current 3GPP system, a transmission delay is relatively long during data transmission. It is difficult to meet a transmission delay requirement of V2X service data

SUMMARY

Embodiments of the present application provide a V2X message transmission method and a related network element, to reduce a transmission delay of a V2X message.

A first aspect of the embodiments of the present application provides a V2X message transmission method. The method includes receiving, by a base station, a V2X message sent by user equipment UE on a vehicle-to-everything V2X bearer. The V2X bearer is a bearer used to transmit only the V2X message between the UE and the base station. The method further includes sending, by the base station, the V2X message to a local broadcast multicast service center BM-SC.

In the foregoing technical solution, after receiving the V2X message sent by the UE on the V2X bearer, the base station directly sends the V2X message to the local BM-SC. The V2X message is transmitted without passing through a core network, and no transmission delay of the core network is generated, thereby reducing the transmission delay of the V2X message.

With reference to the first aspect, in a first possible implementation of the first aspect, after the sending, by the base station, the V2X message to a local BM-SC, the method further includes receiving, by the base station, the V2X message sent by the local BM-SC on a multimedia broadcast multicast service MBMS bearer, and broadcasting the V2X message. The MBMS bearer is a bearer used to transmit the V2X message between the base station and the local BM-SC.

In the foregoing technical solution, after receiving the V2X message, the local BM-SC directly sends the V2X message to the base station on the MBMS bearer, and no bearer selection step needs to be performed, thereby reducing a transmission delay of the transmission of the V2X message from the local BM-SC to the base station.

With reference to the first aspect or the first possible implementation of the first aspect, in a second possible implementation of the first aspect, before the receiving, by a base station, a V2X message sent by user equipment UE on a vehicle-to-everything (V2X) bearer, the method further includes receiving, by the base station, a V2X bearer setup request sent by a mobility management entity MME and sending, by the base station, a V2X bearer setup response message to the MME. The V2X bearer setup request is used to request to set up the V2X bearer. The V2X bearer setup response message is used by the MME to determine that the setup of the V2X bearer is completed.

With reference to the first aspect or the first possible implementation of the first aspect, in a third possible implementation of the first aspect, before the receiving, by the base station, the V2X message sent by the local BM-SC on an MBMS bearer, the method further includes receiving, by the base station, a session start request sent by the local BM-SC and sending, by the base station, a session start response message to a local MBMS-GW by using the MME. The session start request is used to request to set up the MBMS bearer.

A second aspect of the embodiments of the present application provides a V2X message transmission method, including sending, by user equipment UE, a V2X message to a base station on a vehicle-to-everything (V2X) bearer, so that the base station sends the V2X message to a local broadcast multicast service center BM-SC. The V2X bearer is a bearer used to transmit only the V2X message between the UE and the base station.

A third aspect of the embodiments of the present application provides a V2X message transmission method, including: receiving, by a local broadcast multicast service center BM-SC, a V2X message sent by a base station, where the V2X message is sent by user equipment UE to the base station on a vehicle-to-everything (V2X) bearer, and the V2X bearer is a bearer used to transmit only the V2X message between the UE and the base station.

A fourth aspect of the embodiments of the present application provides a V2X bearer setup method, including: receiving, by a mobility management entity MME, a packet data network PDN connection request sent by user equipment UE by using a base station, where the PDN connection request carries an access point name APN. The method further includes sending, by the MME, a V2X bearer setup request to a base station. The V2X bearer setup request is used to request to set up a V2X bearer. The method further includes receiving, by the MME, a bearer setup response message sent by the base station.

A fifth aspect of the embodiments of the present application provides a base station, including: a receiving unit, configured to receive a V2X message sent by user equipment UE on a vehicle-to-everything (V2X) bearer. The V2X bearer is a bearer used to transmit only the V2X message between the UE and the base station. The base station further includes sending unit, configured to send the V2X message received by the receiving unit to a local broadcast multicast service center BM-SC.

A sixth aspect of the embodiments of the present application provides user equipment UE, including: a sending unit, configured to send a V2X message to a base station on a vehicle-to-everything (V2X) bearer, so that the base station sends the V2X message to a local broadcast multicast service center BM-SC. The V2X bearer is a bearer used to transmit only the V2X message between the UE and the base station.

A seventh aspect of the embodiments of the present application provides a local broadcast multicast service center (BM-SC), including: a receiving unit, configured to receive a V2X message sent by a base station, where the V2X message is sent by user equipment UE to the base station on a vehicle-to-everything (V2X) bearer, and the V2X bearer is a bearer used to transmit only the V2X message between the UE and the base station. The BM-SC further includes a sending unit, configured to send the V2X message received by the receiving unit to the base station.

An eighth aspect of the embodiments of the present application provides a mobility management entity (MME), including: a receiving unit, configured to receive a packet data network PDN connection request sent by user equipment UE, where the PDN connection request carries an access point name APN. The MME further includes a determining unit, configured to determine, based on the APN received by the receiving unit and subscription information of the UE, that a service requested by the UE is a vehicle-to-everything V2X service. The MME further includes a sending unit, configured to send a V2X bearer setup request to a base station, where the V2X bearer setup request is used to request to set up a V2X bearer. The receiving unit is configured to receive a bearer setup response message sent by the base station.

A ninth aspect of the embodiments of the present application provides a base station, where the base station includes a processor and a memory, where the memory stores a group of programs, and the processor is configured to invoke the programs stored in the memory, so that the base station performs some or all steps of the method according to the first aspect.

A tenth aspect of the embodiments of the present application provides user equipment UE, where the UE includes a processor and a memory, where the memory stores a group of programs, and the processor is configured to invoke the programs stored in the memory, so that the UE performs some or all steps of the method according to the second aspect.

An eleventh aspect of the embodiments of the present application provides a local broadcast multicast service center BM-SC, where the local BM-SC includes a processor and a memory, where the memory stores a group of programs, and the processor is configured to invoke the programs stored in the memory, so that the local BM-SC performs some or all steps of the method according to the third aspect.

A twelfth aspect of the embodiments of the present application provides a mobility management entity MME, where the MME includes a processor and a memory, where the memory stores a group of programs, and the processor is configured to invoke the programs stored in the memory, so that the MME performs some or all steps of the method according to the fourth aspect.

BRIEF DESCRIPTION OF THE DRAWINGS

The following briefly describes the accompanying drawings required for describing the embodiments. Apparently, the accompanying drawings in the following description show merely some embodiments of the present application, and persons of ordinary skill in the art may derive other drawings from these accompanying drawings without creative efforts.

DETAILED DESCRIPTION OF ILLUSTRATIVE EMBODIMENTS

For ease of understanding of the embodiments of the present application, related network elements provided in the embodiments of the present application are specifically described as follows.

(1) UE refers to a device that can communicate with one or more core network devices by using a radio access network (RAN), and may include a mobile terminal device, an in-vehicle terminal device, or the like.

(2) A base station may refer to a device that is on an access network and that communicates with a wireless terminal on an air interface by using one or more sectors. The base station may be configured to mutually convert a received over-the-air frame and an Internet Protocol (IP) packet and serve as a router between the wireless terminal and a rest portion of the access network, where the rest portion of the access network may include an IP network. The base station may coordinate attribute management of the air interface. For example, the base station may be a base transceiver station (BTS) in GSM or CDMA, may also be a nodeB (NodeB) in WCDMA, or may further be an evolved NodeB (NodeB, eNB, or e-NodeB, evolved Node B) in LTE. This is not limited in the present application.

(3) A mobility management entity (MME) is responsible for support of non-access stratum signaling and security thereof, selection of a packet data gateway (PGW) and a serving gateway (SGW), MME selection when inter-MME handover is performed, user authentication, roaming control, bear management, mobility management between core network nodes, and the like.

(4) The serving gateway (SGW) is responsible for signaling-plane-related functions such as mobility management and user access control, and is also responsible for user data forwarding, and the like.

(5) The packet data gateway (PGW) is responsible for providing session management, bearer control, data forwarding, IP address assignment, and the like of a user.

(6) A vehicle-to-everything application server (Vehicle-to-Everything Application Server, V2X AS) is a server responsible for processing a V2X service.

(7) A broadcast multicast service center (BM-SC) is an input point that is locally deployed and is mainly responsible for a content transfer service in a multimedia broadcast multicast service (MBMS). The broadcast multicast service center is responsible for setting up and controlling an MBMS transmission bearer in the core network, is also responsible for scheduling and transfer of MBMS transmission, further provides a service notification to a terminal device, and so on.

(8) A multimedia broadcast multicast service gateway (MBMS-GW) is locally deployed and is responsible for user data forwarding in the MBMS, and the like.

Figure 1:
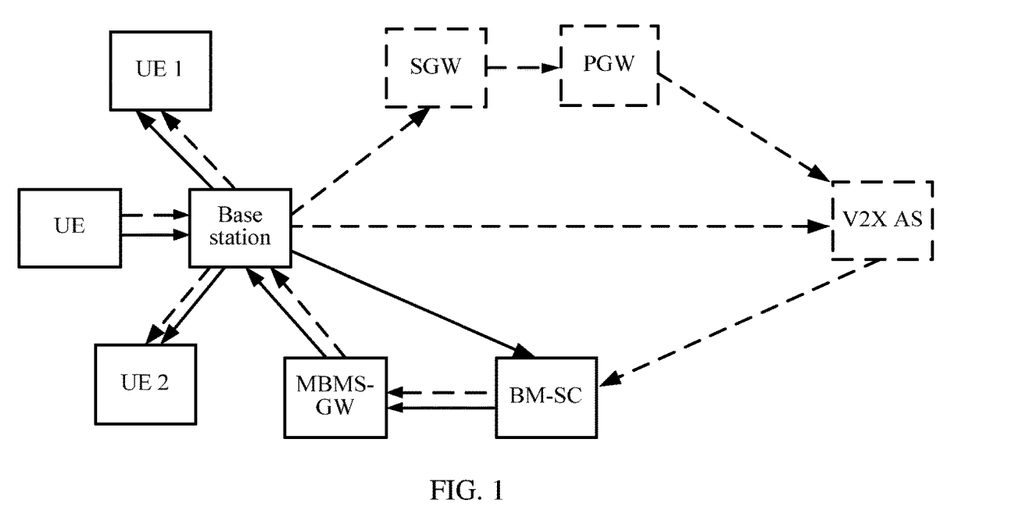
FIG. 1 is a schematic architectural diagram of a V2X message transmission system according to an embodiment of the present application.

The following first describes a schematic architectural diagram of a system provided in the present application. FIG. 1 is a schematic architectural diagram of a V2X message transmission system according to an embodiment of the present application, providing and including the following network elements: UE, a base station, an SGW, a PGW, a V2X AS, a BM-SC, an MBMS-GW, and the like. Usually, as shown by dashed lines in FIG. 1, when the UE needs to send a V2X message, the UE first sends the V2X message to the base station and then sends the V2X message to a remote V2X AS by using the SGW, the PGW, and the like, the remote V2X AS sends the V2X message to the BM-SC and then sends the V2X message to a base station by using the MBMS-GW, and the base station broadcasts the message to another UE (such as UE 1 and UE 2 in the figure).

In this embodiment of the present application, to reduce a transmission delay of a core network, in this embodiment of the present application, the BM-SC and the MBMS-GW are deployed close to a base station location, in other words, deployed locally. As shown by solid lines in FIG. 1, after receiving the V2X message sent by the UE on a V2X bearer, the base station may directly send the V2X message to the local BM-SC, after receiving the V2X message, the local BM-SC directly sends the V2X message to the base station on an MBMS bearer by using the local MBMS-GW, and the base station broadcasts the message to another UE (such as UE 1 and UE 2 in the figure). Optionally, the local BM-SC may store migrated data of the V2X AS. Further, optionally, after receiving the V2X message sent by the UE on the V2X bearer, the base station may alternatively send the V2X message to a locally deployed V2X AS. The V2X AS has migrated related data of the remote V2X AS. Then the local V2X AS sends the V2X message to the base station on the MBMS bearer by using the local BM-SC and the local MBMS-GW, and the base station broadcasts the message to another UE. According to the method, the V2X message does not pass through the core network, and the local BM-SC does not need to perform bearer selection, reducing a transmission delay of the V2X message.

Figure 2:
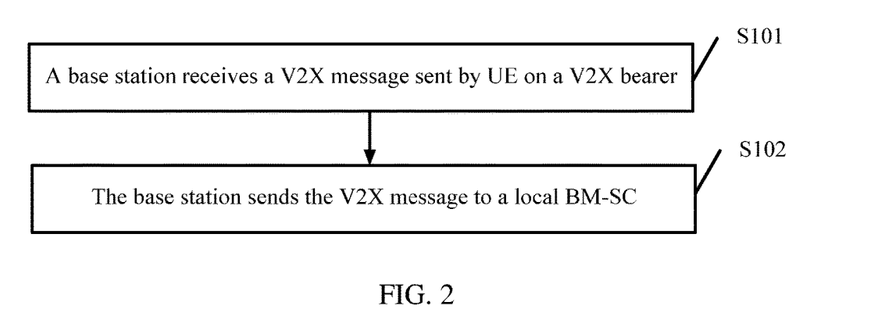
FIG. 2 is a schematic flowchart of a V2X message transmission method according to an embodiment of the present application.

FIG. 2 is a schematic flowchart of a V2X message transmission method according to an embodiment of the present application. As shown in FIG. 2, the method may include steps S101 and S102.

S101: A base station receives a V2X message sent by UE on a V2X bearer.

The V2X bearer is a bearer used to transmit only the V2X message between the UE and the base station.

Figure 2A:
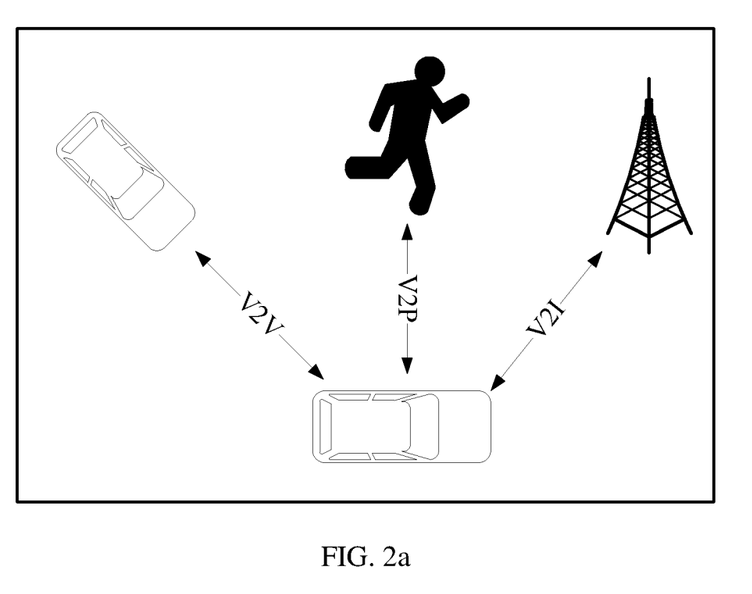
FIG. 2*a* is a schematic diagram of a V2X service application scenario according to an embodiment of the present application.

Specifically, this embodiment of the present application is applied to a V2X service application scenario. FIG. 2a is a schematic diagram of a V2X service application scenario according to an embodiment of the present application. The V2X service application scenario may include V2V, V2I, and V2P, namely, vehicle-to-vehicle communication, vehicle-to-infrastructure communication, and vehicle-to-pedestrian communication.

A V2X service is implemented by using the V2X message, and a main transmission manner for the V2X message is broadcast. For example, when a vehicle A is urgently braked, the vehicle A sends a V2X message to a surrounding vehicle. The V2X message includes urgent braking information, so that after receiving the V2X message, the surrounding vehicle determines, for example, to slow down, to avoid a traffic accident caused by collision with the vehicle A.

In this embodiment of the present application, the UE sends the V2X message to the base station on the V2X bearer. The V2X bearer is the bearer used to transmit only the V2X message between the UE and the base station. Before this process, the method may further include: setting up the V2X bearer. To be specific, the UE may send a PDN connection setup request to an MME by using the base station. The PDN connection setup request carries an access point name (Access Point Name, APN). After determining, based on the APN, that a service requested by the UE is a V2X service, the MME may complete the V2X bearer setup by using a process such as session setup. If the base station receives the V2X message, and determines that the V2X message is sent by the UE on the V2X bearer, the base station may transmit the V2X message to a local BM-SC based on a transmission rule for the V2X bearer setup.

S102: The base station sends the V2X message to a local BM-SC.

Specifically, if the base station receives the V2X message and the V2X message is sent by the UE on the V2X bearer, the base station may select the local BM-SC as a transmission destination node in a next step, and send the V2X message to the local BM-SC. After receiving the V2X message, the local BM-SC sends the V2X message to the base station by using the local MBMS-GW, and the base station broadcasts the V2X message, so that another UE in an area covered by the base station can receive the V2X message.

Further, the local BM-SC may send the V2X message to the base station on a bearer that is specially used to transmit the V2X message and that is between the local BM-SC and the base station, for example, an MBMS bearer. Before the MBMS bearer is used, the method may further include: setting up the MBMS bearer between the local BM-SC and the base station.

It can be learned from the foregoing that, in this embodiment of the present application, the base station receives the V2X message sent by the UE on the V2X bearer, and sends the V2X message to the local BM-SC. Then, the local BM-SC directly sends the V2X message to the base station, and the base station broadcasts the V2X message. In a transmission process, the V2X message does not pass through the core network, and no transmission delay of the core network is generated, thereby reducing a transmission delay of the V2X message.

Figure 3:
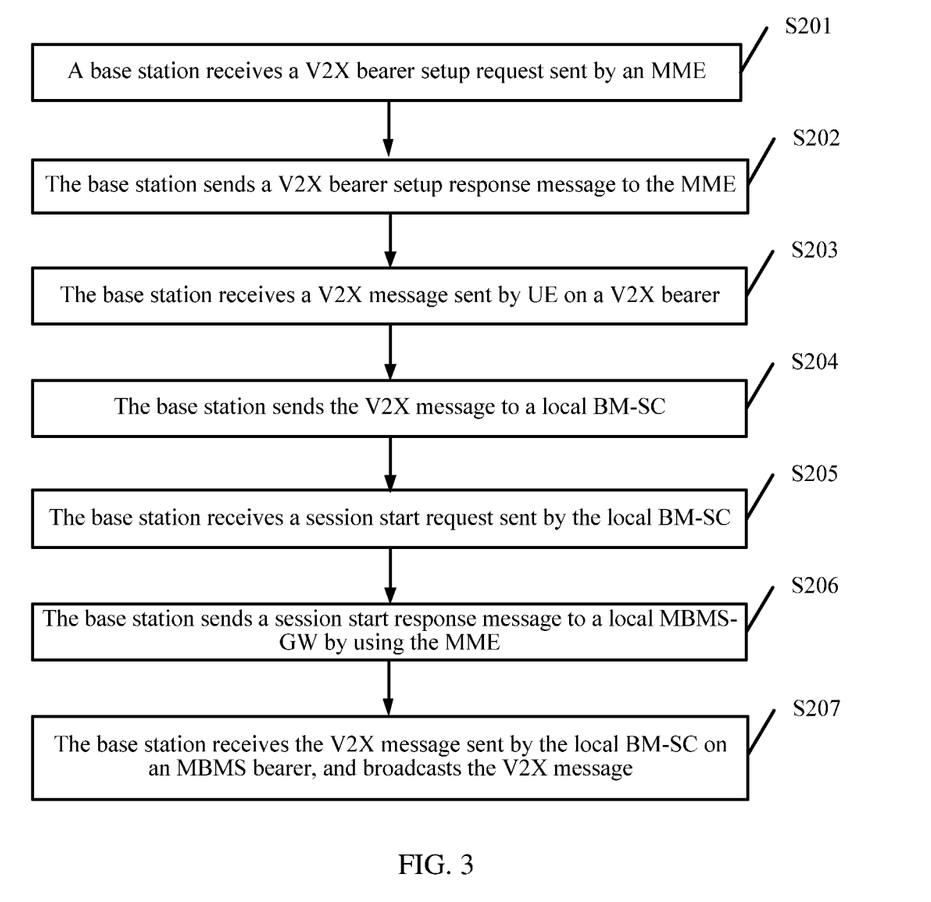
FIG. 3 is a schematic flowchart of another V2X message transmission method according to an embodiment of the present application.

FIG. 3 is a schematic flowchart of another V2X message transmission method according to an embodiment of the present application. The method includes steps S201 to S207.

S201: A base station receives a V2X bearer setup request sent by an MME.

The V2X bearer setup request is used to request to set up a V2X bearer. The V2X bearer setup request may carry V2X bearer indication information. The V2X bearer indication information is used to indicate that a bearer corresponding to a bearer identifier (ID) is a bearer for transmitting a V2X message.

Specifically, the V2X bearer is a bearer used to transmit only the V2X message between UE and the base station.

S202: The base station sends a V2X bearer setup response message to the MME.

The V2X bearer setup response message is used by the MME to determine that the setup of the V2X bearer is completed.

Specifically, the base station may determine, based on a V2X bearer indication message, which bearer is the bearer for transmitting the V2X message. After receiving the V2X bearer setup request, the base station sends the V2X bearer setup response message to the MME. After receiving the V2X bearer setup response message, the MME determines that the setup of the V2X bearer is completed.

Optionally, before the MME sends the V2X bearer setup request to the base station, the method further includes the following step: receiving, by the base station, a PDN connection request sent by the UE, and sending the PDN connection request to the MME, so that the MME performs a session setup process. The PDN connection request carries an APN, and the APN is used by the MME to determine a service requested by the UE.

Further, after the base station receives the V2X bearer setup request, the method further includes: sending, by the base station, a Radio Resource Control (RRC) connection configuration message to the UE, and receiving an RRC connection configuration complete message sent by the UE.

Further, after the base station sends the V2X bearer setup response message to the MME, the method may further include: receiving a PDN connection complete message sent by the UE, and sending the PDN connection complete message to the MME.

Optionally, after the setup of the V2X bearer is completed, the method further includes: sending, by the UE, the V2X message to the base station on the V2X bearer.

S203: The base station receives a V2X message sent by UE on a V2X bearer.

S204: The base station sends the V2X message to a local BM-SC.

In this embodiment of the present application, for specific explanations of steps S203 and S204, refer to steps S101 and S102 in the embodiment corresponding to FIG. 2. Details are not described herein again.

S205: The base station receives a session start request sent by the local BM-SC.

The session start request is used to request to set up an MBMS bearer. The session start request may carry a temporary mobile group identity (TMGI) and indication information. The TMGI is a temporary mobile group identifier for allocating a bearer. The indication information is used to indicate that a bearer corresponding to the TMGI is a bearer for transmitting the V2X service.

S206: The base station sends a session start response message to a local MBMS-GW by using the MME.

Specifically, in this embodiment of the present application, the MBMS bearer is a bearer used to transmit the V2X message between the base station and the local BM-SC. Before receiving the V2X message sent by the local BM-SC on the MBMS bearer, the base station needs to first set up the MBMS bearer. In an MBMS bearer setup process, the base station receives the session start request sent by the local BM-SC, and sends the session start response message to the local MBMS-GW by using the MME. Before the base station receives the session start request sent by the local BM-SC, the method further includes the following steps: sending, by the local BM-SC, the session start request to the local MBMS-GW, and sending, by the local MBMS-GW, a session start response message to the local BM-SC and sending, to the base station, the session start request sent by the local BM-SC.

S207: The base station receives the V2X message sent by the local BM-SC on an MBMS bearer, and broadcasts the V2X message.

After receiving the V2X message sent by the local BM-SC on the MBMS bearer, the base station broadcasts the V2X message, so that another UE in an area covered by the base station can receive the broadcast V2X message.

It can be learned from the foregoing that, in this embodiment of the present application, after the V2X bearer and the MBMS bearer are set up, the base station receives the V2X message sent by the UE on the V2X bearer and transmits the V2X message to the local BM-SC. Then the local BM-SC sends the V2X message to the base station on the MBMS bearer specially used for V2X message transmission, and the base station broadcasts the V2X message. In this process, the V2X message is transmitted without passing through a core network, there is no transmission delay of the core network, and a time of bearer selection is reduced, thereby reducing a transmission delay of the V2X message.

Figure 4:
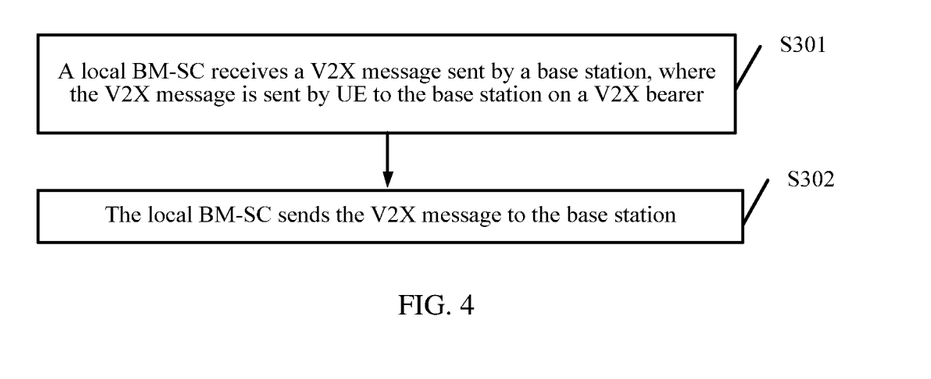
FIG. 4 is a schematic flowchart of still another V2X message transmission method according to an embodiment of the present application.

FIG. 4 is a schematic flowchart of still another V2X message transmission method according to an embodiment of the present application. The method includes steps S301 and S302.

S301: A local BM-SC receives a V2X message sent by a base station, where the V2X message is sent by UE to the base station on a V2X bearer.

The V2X bearer is a bearer used to transmit only the V2X message between the UE and the base station.

S302: The local BM-SC sends the V2X message to the base station.

For example, the UE sends a V2X message to a base station A on the V2X bearer. After determining that the V2X message is sent by the UE on the V2X bearer, the base station A directly sends the V2X message to the local BM-SC. After receiving the V2X message sent by the base station A, the local BM-SC may send the V2X message to a base station B by selecting a suitable bearer, such as an MBMS bearer. The base station A and the base station B may be a same base station, or may be different base stations.

It can be learned from the foregoing V2X message transmission process that, after the V2X message is sent to the local BM-SC, the V2X message is directly sent by the local BM-SC to the base station, and is transmitted to the base station without passing through a core network. Therefore, a transmission delay of the core network is reduced.

Optionally, the local BM-SC may further send the V2X message to the base station on the MBMS bearer. The MBMS bearer is a bearer used to transmit the V2X message between the base station and the local BM-SC. In this way, a time of bearer selection in a V2X message transmission process can be reduced, thereby reducing the transmission delay.

Before the MBMS bearer is used, the method may further include: setting up the MBMS bearer, to be specific, sending, by the local BM-SC, a session start request to the local MBMS-GW, and receiving, by the local BM-SC, a session start response message sent by the local MBMS-GW.

It can be learned from the foregoing that, in this embodiment of the present application, after the UE sends the V2X message to the base station on the V2X bearer, the base station directly sends the V2X message to the local BM-SC, and then the local BM-SC sends the V2X message to the base station. In this process, the V2X message is transmitted without passing through a core network, and there is no transmission delay of the core network, thereby reducing a transmission delay of the V2X message.

Figure 5:
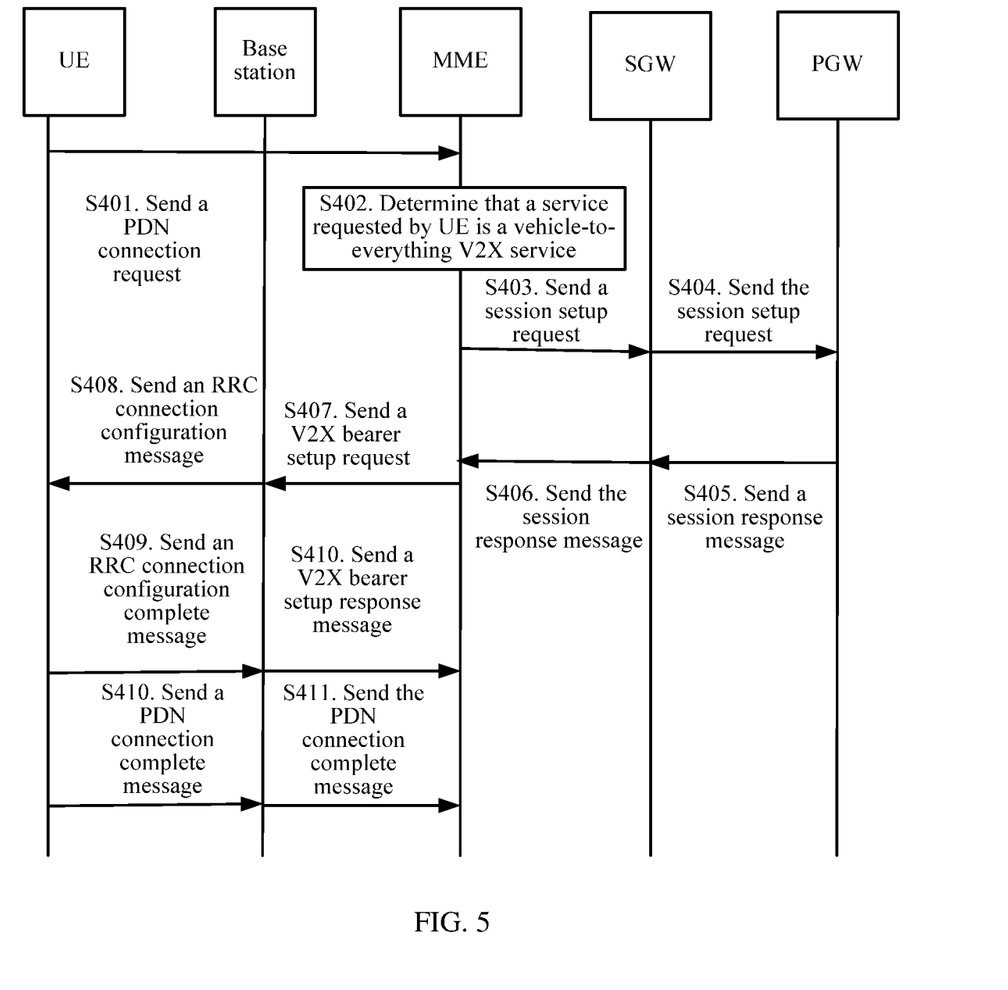
FIG. 5 is a flowchart of setting up a V2X bearer according to an embodiment of the present application.

FIG. 5 is a flowchart of setting up a V2X bearer according to an embodiment of the present application. S401 to S412 are specifically included.

S401: UE sends a PDN connection request to an MME.

The PDN connection request carries an APN, and the APN is used by the MME to determine a service requested by the UE.

Specifically, the UE sends the PDN connection request to a base station, and the base station sends the PDN connection request to the MME. The PDN connection request carries the APN, and the APN is used by the MME to determine the service requested by the UE.

S402: The MME determines, based on the PDN connection request, that a service requested by the UE is a vehicle-to-everything V2X service.

Specifically, the MME determines, based on the APN in the PDN connection request and subscription information of the UE, that the service requested by the UE is the vehicle-to-everything V2X service. For example, the MME determines, based on the subscription information of the UE, that the service corresponding to the APN carried in the PDN connection request is the V2X service. The subscription information of the UE may be stored in the MME in advance.

S403: The MME sends a session setup request to an SGW.

S404: The SGW sends the session setup request to a PGW.

S405: The PGW sends a session response message to the SGW.

S406: The SGW sends the session response message to the MME.

S407: The MME sends a V2X bearer setup request to a base station.

The V2X bearer setup request is used to request to set up the V2X bearer. The V2X bearer setup request may carry V2X bearer indication information, or may carry V2X bearer indication information and PDN connection acceptance information.

The V2X bearer indication information indicates that a bearer corresponding to a bearer ID is a bearer for transmitting the V2X message. The base station may determine the transmission bearer of the V2X message based on the V2X bearer indication information.

Specifically, after receiving the session response message, the MME sends the V2X bearer setup request to the base station.

S408: The base station sends an RRC connection configuration message to the UE.

S409: The UE sends an RRC connection configuration complete message to the base station.

S410: The base station sends a V2X bearer setup response message to the MME.

The V2X bearer setup response message is used by the MME to determine that the setup of the V2X bearer is completed.

Correspondingly, the MME receives the bearer setup response message sent by the base station.

S411: The UE sends a PDN connection complete message to the base station.

S412: The base station sends the PDN connection complete message to the MME.

PDN connection complete message may be used to identify that the setup of the V2X bearer is completed.

According to the solution provided in the foregoing embodiment, the V2X bearer is set up for the V2X service of the UE, so that the base station can accurately identify the V2X message, and the base station sends the V2X message to the local BM-SC. It is avoided that the sending of the V2X message passes through a core network, and a transmission delay of the V2X message is reduced. In addition, a transmission delay caused by transmission resource sharing between the V2X message and another type of message.

Figure 6:
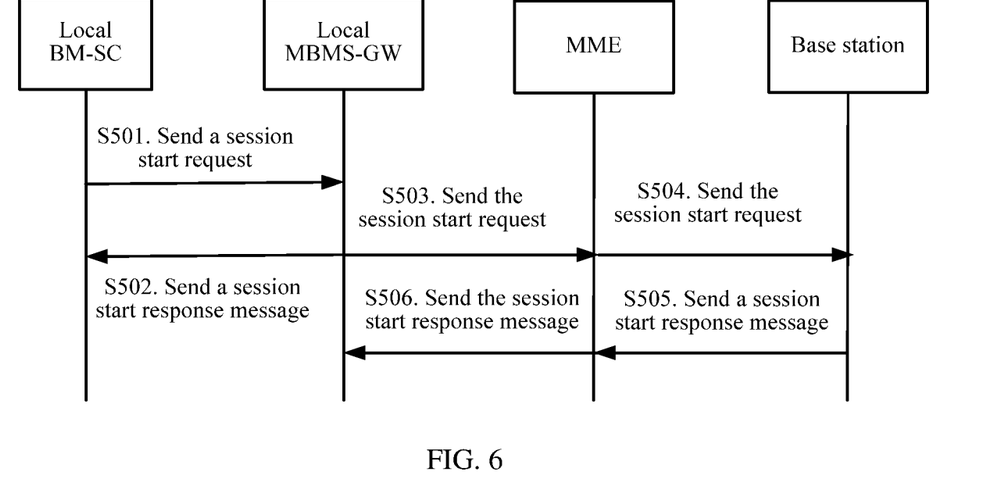
FIG. 6 is a flowchart of setting up an MBMS bearer according to an embodiment of the present application.

FIG. 6 is a flowchart of setting up an MBMS bearer according to an embodiment of the present application. Steps S501 to S506 are specifically included.

S501: A local BM-SC sends a session start request to a local MBMS-GW.

The session start request is used to request to set up the MBMS bearer. The session start request may carry a TMGI and indication information. The TMGI is a temporary mobile group identifier for allocating a bearer. The indication information is used to indicate that a bearer corresponding to the TMGI is a bearer for transmitting the V2X service.

For the MBMS bearer, refer to the related description in the embodiment shown in FIG. 4.

S502: The local MBMS-GW sends a session start response message to the local BM-SC.

Correspondingly, the local BM-SC receives the session start response message sent by the local MBMS-GW.

S503: The local MBMS-GW sends the session start request to an MME.

S504: The MME sends the session start request to a base station.

Correspondingly, the base station receives the session start request sent by the MME.

S505: The base station sends a session start response message to the MME.

S506: The MME sends the session start response message to the local MBMS-GW.

Optionally, after the setup of the MBMS bearer is completed, before the V2X message is sent on the MBMS bearer, the method further includes activating the MBMS bearer. A specific step includes: sending, by a V2X AS, a request for activating the MBMS bearer to the local BM-SC, and indicating that the MBMS bearer corresponding to the TMGI is the bearer for transmitting the V2X service.

Optionally, to improve accuracy of a broadcast range, the V2X AS further sends, to the local BM-SC, UE location information reported by the UE. The location information may be geological location information or cell information. After the MBMS bearer is set up, the local BM-SC returns an MBMS bearer activation response message to the V2X AS.

According to the solution provided in the foregoing embodiment, the MBMS bearer is set up for the V2X message, and the V2X message is directly transmitted on the MBMS bearer, avoiding a transmission delay caused because when transmitting a V2X message to the base station, the local BM-SC selects to transmit the V2X message.

Figure 7:
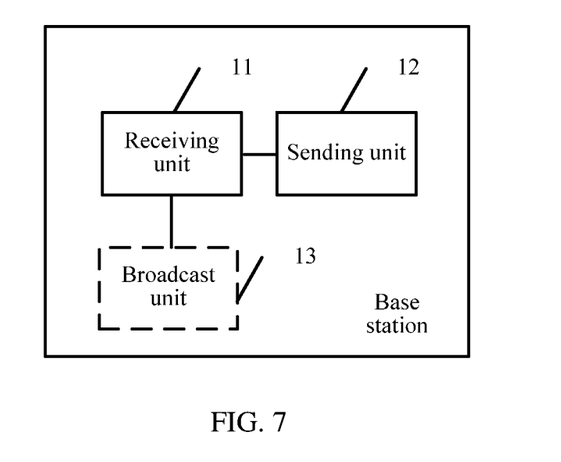
FIG. 7 is a schematic modular diagram of a base station according to an embodiment of the present application.

FIG. 7 is a schematic modular diagram of a base station according to an embodiment of the present application. As shown in FIG. 7, the base station may include a receiving unit 11 and a sending unit 12. The receiving unit 11 is configured to receive a V2X message sent by UE on a V2X bearer. The V2X bearer is a bearer used to transmit only the V2X message between the UE and the base station. The sending unit 12 is configured to send the V2X message received by the receiving unit 11 to a local BM-SC.

Optionally, the base station further includes a broadcast unit 13. The receiving unit 11 is further configured to receive the V2X message sent by the local BM-SC on an MBMS bearer. The MBMS bearer is a bearer used to transmit the V2X message between the base station and the local BM-SC; and the broadcast unit 13 is configured to broadcast the V2X message received by the receiving unit 11.

Optionally, the receiving unit 11 is further configured to receive a V2X bearer setup request sent by an MME, where the V2X bearer setup request is used to request to set up the V2X bearer; and the sending unit 12 is further configured to send a V2X bearer setup response message to the MME. The V2X bearer setup response message is used by the MME to determine that the setup of the V2X bearer is completed.

Optionally, the receiving unit 11 is further configured to receive a session start request sent by the local BM-SC, where the session start request is used to request to set up the MBMS bearer. The sending unit 12 is further configured to send a session start response message to a local MBMS-GW by using the MME.

The base station shown in this embodiment of the present application is configured to perform an action or a step of the base station in any embodiment shown in FIG. 2, FIG. 3, FIG. 5, and FIG. 6. For a technical effect brought by the base station, refer to the specific description in the corresponding method embodiment. Details are not described herein again.

Figure 8:
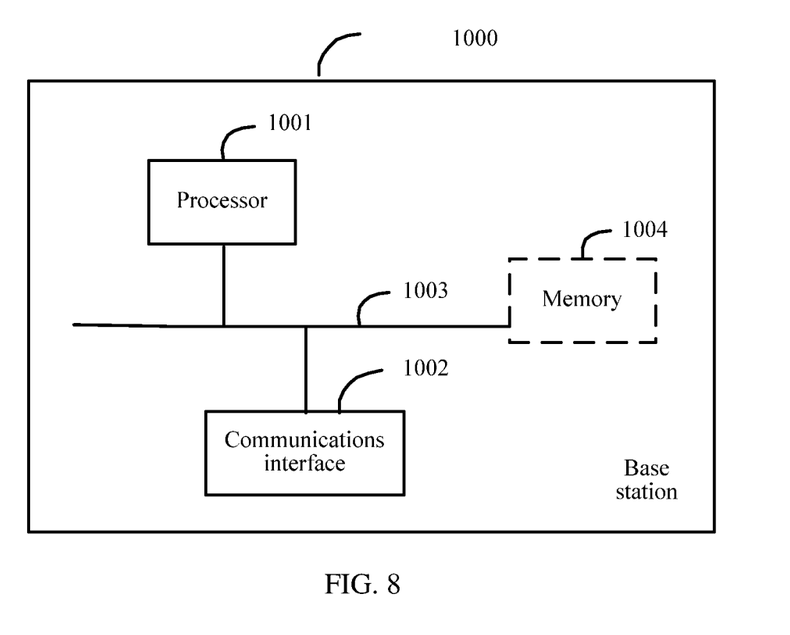
FIG. 8 is a schematic structural diagram of a base station according to an embodiment of the present application.

FIG. 8 is a schematic structural diagram of a base station 1000 according to an embodiment of the present application. The base station 1000 may include a processor 1001 and a communications interface 1002. The processor 1001 and the communications interface 1002 are connected to each other, for example, connected to each other by using a communications bus 1003.

The processor 1001 may be a central processing unit (CPU). The communications interface 1002 may be a wireless communications interface, a wired communications interface, or a combination of the two.

The base station 1000 may further include a memory 1004.

The memory 1004 may include a volatile memory, such as a random access memory (RAM). The memory 1004 may alternatively include a non-volatile memory, such as a read-only memory (ROM), a flash memory, a hard disk drive (HDD), or a solid-state drive (SSD). The memory 1004 may alternatively include any combination of memories of the foregoing types.

If the processor 1002 includes the CPU, the memory may further store program code, and transmit the program code to the CPU, so that the CPU implements this embodiment of the present application based on the program code.

The processor 1001 is configured to receive, by using the communications interface 1002, a V2X message sent by UE on a V2X bearer.

The V2X bearer is a bearer used to transmit only the V2X message between the UE and the base station.

The processor 1001 is further configured to send the V2X message to a local BM-SC by using the communications interface 1002.

In an embodiment, the processor 1001 is further configured to: receive, by using the communications interface 1002, a V2X message sent by the local BM-SC on an MBMS bearer, and broadcast the V2X message by using the communications interface 1002.

The MBMS bearer is a bearer used to transmit the V2X message between the base station and the local BM-SC.

In an embodiment, the processor 1001 is further configured to: receive a V2X bearer setup request sent by an MME; and send a V2X bearer setup response message to the MME.

The V2X bearer setup request is used to request to set up the V2X bearer, and the V2X bearer setup response message is used by the MME to determine that the setup of the V2X bearer is completed.

In an embodiment, the processor 1001 is further configured to receive a session start request sent by the local BM-SC, where the session start request is used to request to set up the MBMS bearer; and send a session start response message to the local MBMS-GW by using the MME.

The base station shown in this embodiment of the present application is configured to perform an action or a step of the base station in any embodiment shown in FIGS. 2, 3, 5, and 6. For a technical effect brought by the base station, refer to the specific description in the corresponding method embodiment. Details are not described herein again.

Figure 9:
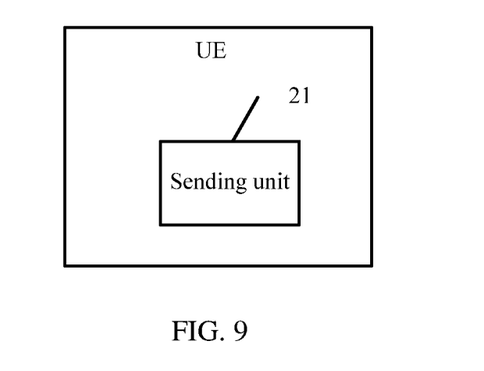
FIG. 9 is a schematic modular diagram of UE according to an embodiment of the present application.

FIG. 9 is a schematic modular diagram of UE according to an embodiment of the present application. As shown in FIG. 9, the UE may include a sending unit 21. The sending unit 21 is configured to send a V2X message to a base station on a V2X bearer, so that the base station sends the V2X message to a local BM-SC, where the V2X bearer is a bearer used to transmit only the V2X message between the UE and the base station.

Optionally, the sending unit 21 is further configured to send a PDN connection request to an MME. The PDN connection request carries an APN, so that the MME sets up the V2X bearer between the UE and the base station based on the PDN connection request.

The UE shown in this embodiment of the present application is configured to perform an action or a step of the UE in the embodiment shown in FIG. 5. For a technical effect brought by the UE, refer to the specific description in the corresponding method embodiment. Details are not described herein again.

Figure 10:
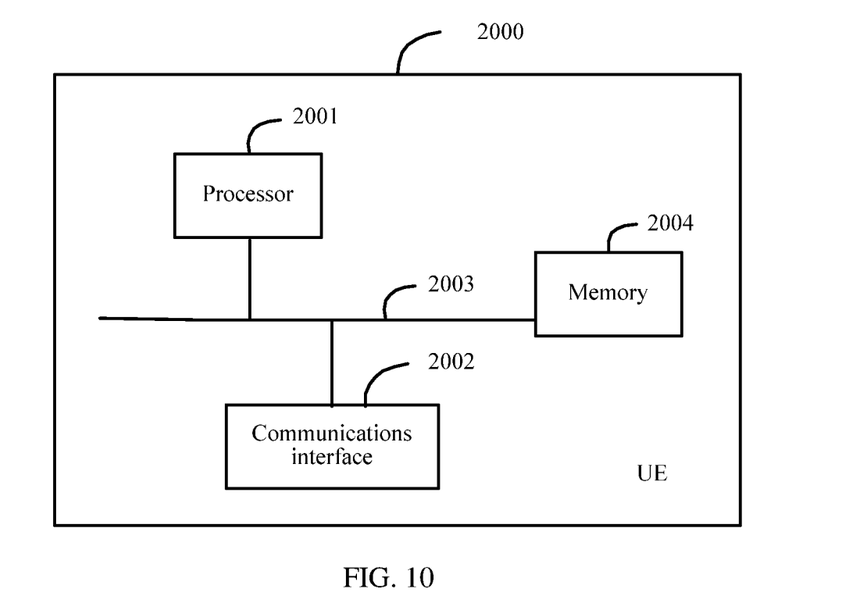
FIG. 10 is a schematic structural diagram of UE according to an embodiment of the present application.

FIG. 10 is a schematic structural diagram of UE 2000 according to an embodiment of the present application. The UE 2000 may include a processor 2001 and a communications interface 2002. The processor 2001 and the communications interface 2002 are connected to each other, for example, connected to each other by using a communications bus 2003. The processor 2001 may be a CPU. The communications interface 2002 may be a wireless communications interface.

The UE 2000 may further include a memory 2004. The memory 2004 may include a RAM. The memory 2004 may alternatively include a non-volatile memory, such as a ROM, a flash memory, an HDD, or an SSD. The memory 2004 may alternatively include any combination of memories of the foregoing types. If the processor 2001 includes the CPU, the memory may further store program code, and transmit the program code to the CPU, so that the CPU implements this embodiment of the present application based on the program code.

The processor 2001 is configured to send a V2X message to a base station on a V2X bearer by using the communications interface 2002, so that the base station sends the V2X message to a local BM-SC.

The V2X bearer is a bearer used to transmit only the V2X message between the UE and the base station.

In an embodiment, the processor 2001 is further configured to send a PDN connection request to the base station by using the communications interface 2002, so that the base station sends the PDN connection request to an MME.

The PDN connection request carries an APN, so that the MME sets up the V2X bearer between the UE and the base station based on the PDN connection request.

The UE shown in this embodiment of the present application is configured to perform an action or a step of the UE in the embodiment shown in FIG. 5. For a technical effect brought by the UE and a specific principle, refer to the specific description in the corresponding method embodiment. Details are not described herein again.

Figure 11:
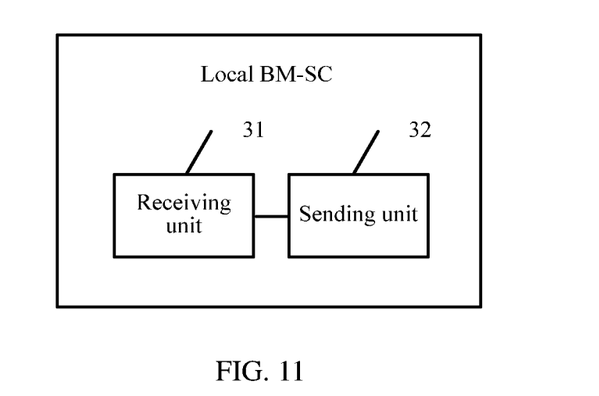
FIG. 11 is a schematic modular diagram of a local BM-SC according to an embodiment of the present application.

FIG. 11 is a schematic modular diagram of a local BM-SC according to an embodiment of the present application. As shown in FIG. 11, the local BM-SC may include a receiving unit 31 and a sending unit 32. The receiving unit 31 is configured to receive a V2X message sent by a base station. The V2X message is sent by UE to the base station on a V2X bearer, and the V2X bearer is a bearer used to transmit only the V2X message between the UE and the base station. The sending unit 32 is configured to send the V2X message received by the receiving unit 31 to the base station.

Optionally, the sending unit 32 is specifically configured to send the V2X message received by the receiving unit 31 to the base station on an MBMS bearer. The MBMS bearer is a bearer used to transmit the V2X message between the base station and the local BM-SC.

Optionally, the sending unit 32 is further configured to send a session start request to a local MBMS-GW. The session start request is used to request to set up the MBMS bearer; and the receiving unit 31 is further configured to receive a session start response message sent by the local MBMS-GW.

The local BM-SC shown in this embodiment of the present application is configured to perform an action or a step of the local BM-SC in an embodiment shown in FIG. 4 to FIG. 6. For a technical effect brought by the local BM-SC and a specific principle, refer to the specific description in the corresponding method embodiment. Details are not described herein again.

Figure 12:
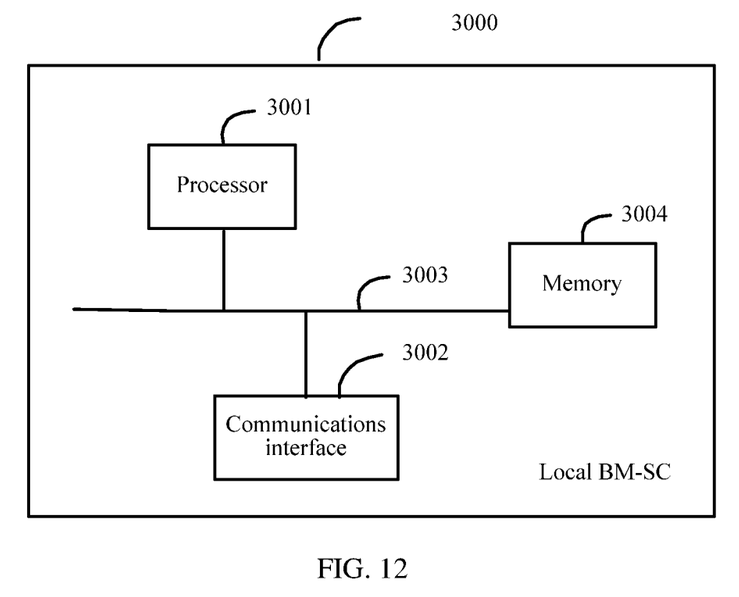
FIG. 12 is a schematic structural diagram of a local BM-SC according to an embodiment of the present application.

FIG. 12 is a schematic structural diagram of a local BM-SC 3000 according to an embodiment of the present application. The local BM-SC 3000 may include a processor 3001 and a communications interface 3002. The processor 3001 and the communications interface 3002 are connected to each other, for example, connected to each other by using a communications bus 3003.

The processor 3001 may be a CPU. The communications interface 3002 may be a wireless communications interface, a wired communications interface, or a combination of the two.

The local BM-SC 3000 may further include a memory 3004. The memory 3004 may include a RAM. The memory 3004 may alternatively include a non-volatile memory, such as a ROM, a flash memory, an HDD, or an SSD. The memory 3004 may alternatively include any combination of memories of the foregoing types.

If the processor 3002 includes the CPU, the memory may further store program code, and transmit the program code to the CPU, so that the CPU implements this embodiment of the present application based on the program code.

The processor 3001 is configured to receive, by using the communications interface 3002, a V2X message sent by a base station.

The V2X message is sent by UE to the base station on a V2X bearer, and the V2X bearer is a bearer used to transmit only the V2X message between the UE and the base station.

In an embodiment, the processor 3001 is further configured to send the V2X message to the base station on an MBMS bearer by using the communications interface 3002.

The MBMS bearer is a bearer used to transmit the V2X message between the base station and the local BM-SC.

In an embodiment, the processor 3001 is further configured to: send a session start request to a local MBMS-GW by using the communications interface 3002, and receive a session start response message sent by the local MBMS-GW.

The session start request is used to request to set up the MBMS bearer.

The local BM-SC shown in this embodiment of the present application is configured to perform an action or a step of the local BM-SC in an embodiment shown in FIG. 4 to FIG. 6. For a technical effect brought by the local BM-SC, refer to the specific description in the corresponding method embodiment. Details are not described herein again.

Figure 13:
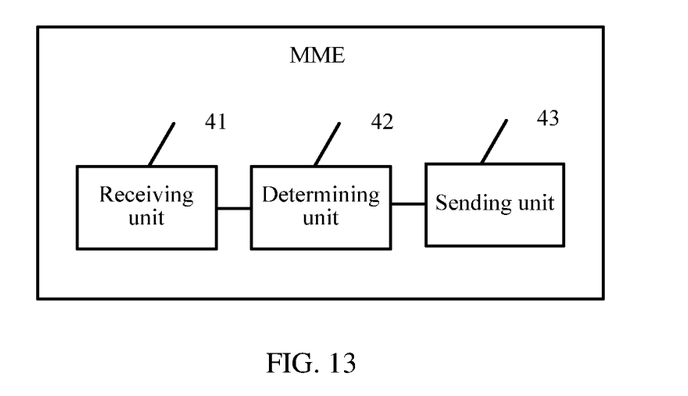
FIG. 13 is a schematic modular diagram of an MME according to an embodiment of the present application.

FIG. 13 is a schematic modular diagram of an MME according to an embodiment of the present application. As shown in FIG. 13, the MME may include a receiving unit 41, a determining unit 42, and a sending unit 43. The receiving unit 41 is configured to receive a PDN connection request sent by UE by using a base station, where the PDN connection request carries an APN. The determining unit 42 is configured to determine, based on the APN received by the receiving unit and subscription information of the UE, that a service requested by the UE is a V2X service. The sending unit 43 is configured to send a V2X bearer setup request to the base station.

The receiving unit 41 is configured to receive a bearer setup response message sent by the base station.

The V2X bearer setup request is used to request to set up the V2X bearer, and the V2X bearer setup response message is used by the MME to determine that the setup of the V2X bearer is completed.

Further, the determining unit 42 is configured to determine, based on the V2X bearer setup response message, that the setup of the V2X bearer is completed.

The MME in this embodiment of the present application is configured to perform a step of an action of the MME in the embodiment shown in FIG. 5 or FIG. 6. The MME can set up a specified bearer for the V2X service, namely, the V2X bearer, so that the base station can accurately identify a V2X message, and directly send the V2X to the local BM-SC, and the V2X message is sent without passing through a core network, reducing a transmission delay of the V2X message. For a specific principle, refer to the specific description in the corresponding method embodiment. Details are not described herein again.

Figure 14:
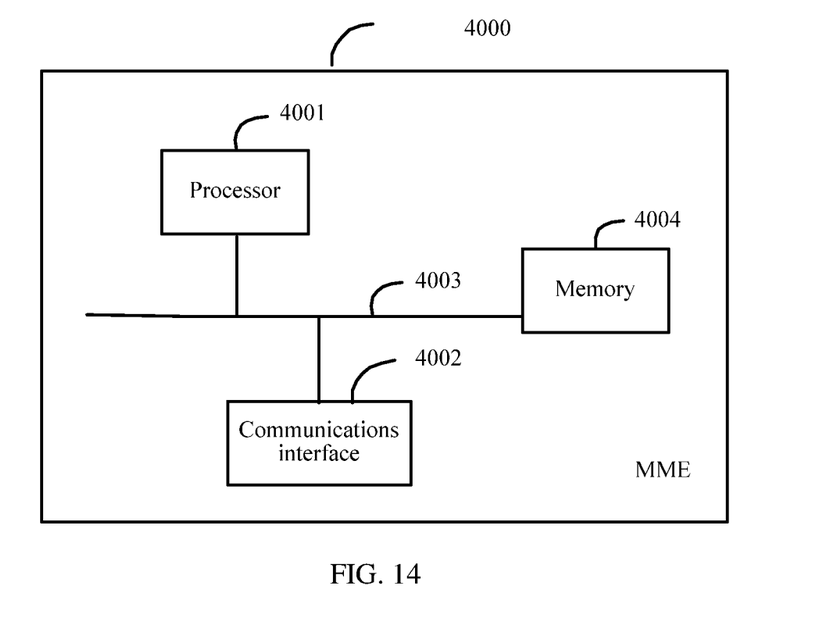
FIG. 14 is a schematic structural diagram of an MME according to an embodiment of the present application.

FIG. 14 is a schematic structural diagram of an MME 4000 according to an embodiment of the present application. The local MME 4000 may include a processor 4001 and a communications interface 4002. The processor 4001 and the communications interface 4002 are connected to each other, for example, connected to each other by using a communications bus 4003.

The processor 4001 may be a CPU. The communications interface 4002 may be a wireless communications interface, a wired communications interface, or a combination of the two.

The MME 4000 may further include a memory 4004. The memory 4004 may include a RAM. The memory 4004 may alternatively include a non-volatile memory, such as a ROM, a flash memory, an HDD, or an SSD. The memory 4004 may alternatively include any combination of memories of the foregoing types.

If the processor 4002 includes the CPU, the memory may further store program code, and transmit the program code to the CPU, so that the CPU implements this embodiment of the present application based on the program code.

The processor 4001 is configured to: receive, by using the communications interface 4002, a PDN connection request sent by UE by using a base station, where the PDN connection request carries an APN; determine, based on the received APN and subscription information of the UE, that a service requested by the UE is a V2X service; send a V2X bearer setup request to the base station by using the communications interface 4002; and receive, by using the communications interface 4002, a bearer setup response message sent by the base station.

The V2X bearer setup request is used to request to set up the V2X bearer, and the V2X bearer setup response message is used by the MME to determine that the setup of the V2X bearer is completed.

The MME shown in this embodiment of the present application is configured to perform an action or a step of the MME in the embodiment shown in FIG. 5 or FIG. 6. For a technical effect of the MME, refer to the specific description in the corresponding method embodiment. Details are not described herein again.

Persons of ordinary skill in the art may understand that all or some of the steps in each of the method of the embodiments may be implemented by a program instructing a processor. The foregoing program may be stored in a computer readable storage medium. The storage medium may be a random-access memory, a read-only memory, a flash memory, a hard disk, a solid state drive, a magnetic tape (magnetic tape), a floppy disk (floppy disk), an optical disc (optical disc), or any combination thereof.

The foregoing descriptions are merely example implementations of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:
1. A method, comprising:
  receiving, by a base station, a vehicle-to-everything (V2X) message from user equipment (UE) on a V2X bearer, wherein the V2X bearer is a bearer transmitting only the V2X message between the UE and the base station, and the V2X bearer is set up through a core network; and
  sending, by the base station, the V2X message to a local broadcast multicast service center (BM-SC) without passing through the core network.
2. The method according to claim 1, wherein the method further comprises:
  receiving, by the base station, the V2X message from the local BM-SC on a multimedia broadcast multicast service (MBMS) bearer; and
  broadcasting the V2X message, wherein the MBMS bearer is a bearer transmitting the V2X message between the base station and the local BM-SC.
3. The method according to claim 2, wherein before receiving, by the base station, the V2X message from the local BM-SC on the MBMS bearer, the method further comprises:
  receiving, by the base station, a session start request from the local BM-SC, wherein the session start request requests set up of the MBMS bearer; and
  sending, by the base station, a session start response message to a local multimedia broadcast multicast service gateway (MBMS-GW) through a mobility management entity.
4. The method according to claim 1, wherein before receiving, by the base station, the V2X message from the UE on the V2X bearer, the method further comprises:
  receiving, by the base station, a V2X bearer setup request from a mobility management entity, wherein the V2X bearer setup request requests set up of the V2X bearer; and
  sending, by the base station, a V2X bearer setup response message to the mobility management entity, wherein the V2X bearer setup response message informs the mobility management entity that setup of the V2X bearer is completed.
5. A method, comprising:
  receiving, by a local broadcast multicast service center (BM-SC), a vehicle-to-everything (V2X) message from a base station, wherein the V2X message is sent by user equipment (UE) to the base station on a V2X bearer, the V2X bearer is a bearer transmitting only the V2X message between the UE and the base station, and the V2X bearer is set up through a core network; and
  sending, by the local BM-SC, the V2X message to the base station without passing through the core network.
6. The method according to claim 5, wherein sending, by the local BM-SC, the V2X message to the base station comprises:
  sending, by the local BM-SC, the V2X message to the base station on a multimedia broadcast multicast service (MBMS) bearer, wherein the MBMS bearer is a bearer transmitting the V2X message between the base station and the local BM-SC.
7. The method according to claim 6, wherein before sending, by the local BM-SC, the V2X message to the base station on the MBMS bearer, the method further comprises:
  sending, by the local BM-SC, a session start request to a local multimedia broadcast multicast service gateway (MBMS-GW), wherein the session start request requests set up of the MBMS bearer; and
  receiving, by the local BM-SC, a session start response message from the local MBMS-GW.
8. A base station, wherein the base station comprises:
  a processor; and a non-transitory computer-readable storage medium storing a program to be executed by the processor, the program including instructions for:

receiving a vehicle-to-everything (V2X) message from user equipment (UE) on a vehicle-to-everything V2X bearer, wherein the V2X bearer is a bearer transmitting only the V2X message between the UE and the base station, and the V2X bearer is set up through a core network; and sending the V2X message to a local broadcast multicast service center (BM-SC) without passing through the core network.

9. The base station according to claim 8, wherein the instructions comprise further instructions for:

receiving the V2X message from the local BM-SC on a multimedia broadcast multicast service (MBMS) bearer; and broadcasting the V2X message, wherein the MBMS bearer is a bearer transmitting the V2X message between the base station and the local BM-SC.

10. The base station according to claim 9, wherein the instructions comprise further instructions for:

receiving a session start request from the local BM-SC, wherein the session start request requests set up of the MBMS bearer; and sending a session start response message to a local multimedia broadcast multicast service gateway (MBMS-GW) through a mobility management entity.

11. The base station according to claim 8, wherein the instructions comprise further instructions for:

receiving a V2X bearer setup request from a mobility management entity, wherein the V2X bearer setup request requests set up of the V2X bearer; and sending a V2X bearer setup response message to the mobility management entity, wherein the V2X bearer setup response message informs the mobility management entity that setup of the V2X bearer is completed.

12. A local broadcast multicast service center (BM-SC), wherein the local BM-SC comprises:

a processor; and a non-transitory computer-readable storage medium storing a program to be executed by the processor, the program including instructions for:

receiving a vehicle-to-everything (V2X) message from a base station, wherein the V2X message is sent by user equipment (UE) to the base station on a V2X bearer, the V2X bearer is a bearer transmitting only the V2X message between the UE and the base station, and the V2X bearer is set up through a core network; and sending, by the local BM-SC, the V2X message to the base station without passing through the core network.

13. The BM-SC according to claim 12, wherein the instructions comprise further instructions for:

sending the V2X message to the base station on a multimedia broadcast multicast service (MBMS) bearer, wherein the MBMS bearer is a bearer transmitting the V2X message between the base station and the local BM-SC.

14. The BM-SC according to claim 13, wherein the instructions comprise further instructions for:

sending a session start request to a local multimedia broadcast multicast service gateway (MBMS-GW), wherein the session start request requests set up the MBMS bearer; and receiving a session start response message from the local MBMS-GW.

* * * * *